(12) United States Patent
Nakata et al.

(10) Patent No.: US 10,147,993 B2
(45) Date of Patent: Dec. 4, 2018

(54) CONNECTING DEVICE

(71) Applicant: Molex, LLC, Lisle, IL (US)

(72) Inventors: Tomonari Nakata, Yamato (JP);
Naoyoshi Tamura, Yamato (JP)

(73) Assignee: Molex, LLC, Lisle, IL (US)

(*) Notice: Subject to any disclaimer, the term of this patent is extended or adjusted under 35 U.S.C. 154(b) by 111 days.

(21) Appl. No.: 15/118,944

(22) PCT Filed: Feb. 16, 2015

(86) PCT No.: PCT/US2015/015995
§ 371 (c)(1),
(2) Date: Aug. 16, 2016

(87) PCT Pub. No.: WO2015/126770
PCT Pub. Date: Aug. 27, 2015

(65) Prior Publication Data
US 2017/0054194 A1    Feb. 23, 2017

(30) Foreign Application Priority Data

Feb. 19, 2014  (JP) .................................. 2014-029524

(51) Int. Cl.
*H01P 5/02*     (2006.01)
*H04B 5/00*    (2006.01)

(52) U.S. Cl.
CPC ............ *H01P 5/02* (2013.01); *H04B 5/0012* (2013.01)

(58) Field of Classification Search
CPC ............ H01P 5/02; H01P 5/04; H04B 5/0012

USPC ............ 333/24 R, 24 C, 245, 248, 254, 255
See application file for complete search history.

(56) References Cited

U.S. PATENT DOCUMENTS

| 5,015,061 A | 5/1991 | Giannini |
| 2009/0117783 A1 | 5/2009 | Wu |
| 2012/0207507 A1 | 8/2012 | Okamoto et al. |
| 2012/0262938 A1* | 10/2012 | Price ..................... G02B 6/262 362/553 |
| 2013/0202253 A1 | 8/2013 | Rosenberg et al. |

FOREIGN PATENT DOCUMENTS

| JP | 06-342679 A | 12/1994 |
| JP | 10-334996 A | 12/1998 |
| JP | 2009-117249 A | 5/2009 |

* cited by examiner

*Primary Examiner* — Rakesh Patel
*Assistant Examiner* — Jorge Salazar, Jr.
(74) *Attorney, Agent, or Firm* — James A. O'Malley

(57) ABSTRACT

The connecting device is composed of a first connecting member having a first housing receiving a connected first waveguide, and a second connecting member having a second housing receiving a connected second waveguide, the first housing having a first mating surface and a first magnet, and the second housing having a second mating surface and a second magnet, and the first connecting member and the second connecting member being displaced relative to each other in a mating direction orthogonal to the axial direction of the first waveguide and the second waveguide, and being positioned relative to each other by the magnetic force of the first magnet and the second magnet.

15 Claims, 8 Drawing Sheets

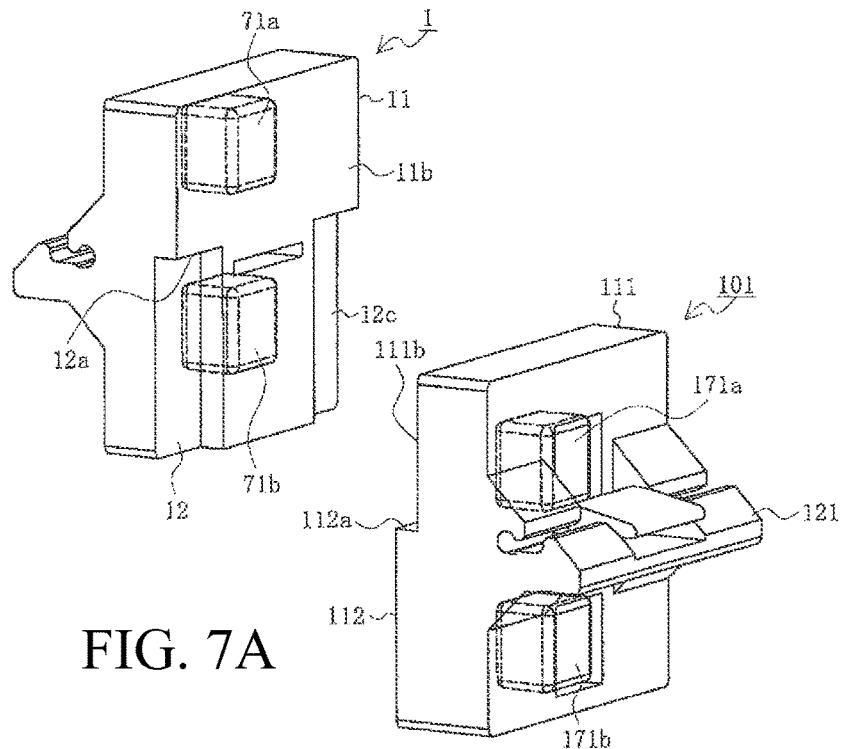
FIG. 7A
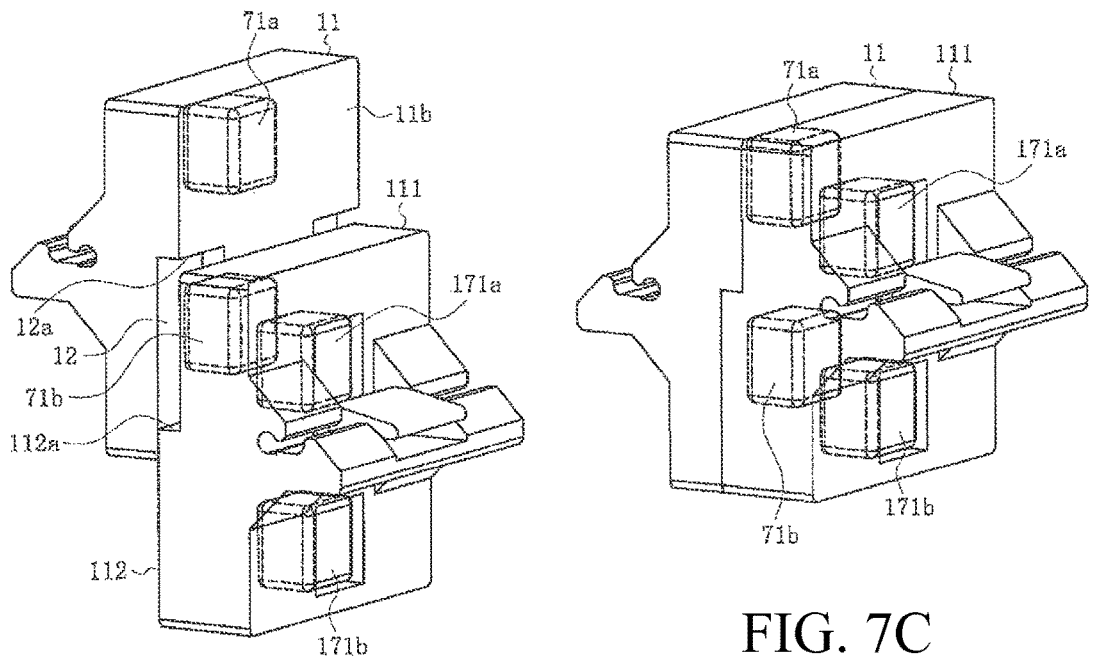
FIG. 7B
FIG. 7C

CONNECTING DEVICE

REFERENCE TO RELATED APPLICATIONS

The Present Disclosure claims priority to prior-filed Japanese Patent Application No. 2014-029524, entitled "Connecting Device," filed on 19 Feb. 2014 with the Japanese Patent Office. The content of the aforementioned Patent Application is incorporated in its entirety herein.

BACKGROUND OF THE PRESENT DISCLOSURE

The Present Disclosure relates, generally, to connecting devices.

Connecting devices have been proposed in which magnets are used to connect cables. An example is disclosed in Japanese Patent Application No. 1993-156104, the content of which is hereby incorporated in its entirety herein.

FIGS. 8A and 8B are a pair of perspective views of conventional connecting devices of the prior art, in which FIG. 8A is a perspective view of the connecting device on the fixed side, and FIG. 8B is a perspective view of the connecting device on the cable side. In FIG. 8A, 811 is the housing for the pin connectors in the fixed-side connecting device which is connected, for example, to the edge of a circuit board (not shown). Also, 861 denotes pin contacts molded in the housing 811, which protrude from the front surface of the housing 811. The other end (not shown) of the pin contacts 861 are connected electrically to a connection portion of the circuit board using a connecting means such as soldering.

A magnet 871, having an L-shaped planar profile, is arranged at both the left and right ends of the housing 811. The magnet 871 on the right side in the figure has the north pole arranged on the inside in the transverse direction of the housing 811, and has the south pole arranged on the side protruding forward on the outside in the transverse direction. The magnet 871 on the left side in the figure has the south pole arranged on the inside in the transverse direction of the housing 811, and has the north pole arranged on the side protruding forward on the outside in the transverse direction. The tiered surface between the north and south poles of each magnet 871 is an inclined guiding surface 872 open towards the outside.

In FIG. 8B, 911 denotes the housing for the cable connector or cable-side connecting device, and is affixed to the rear surface of a band-like cable 991 composed of a flexible printed circuit. Also, 992 denotes the band-like contacts or wires partially exposed in the front surface by removing the coating from the band-like cable 991.

A magnet 971, also having an L-shaped planar profile, is arranged at both the left and right ends of the housing 911. The magnet 971 on the right side in the figure has the north pole arranged on the inside in the transverse direction of the housing 911, and the south pole arranged on the outside in the transverse direction. The magnet 971 on the left side in the figure has the south pole arranged on the inside in the transverse direction of the housing 911, and the north pole arranged on the outside in the transverse direction. The tiered surface between the north and south poles of each magnet 971 is an inclined guiding surface 972 closed towards the inside.

When the pin connector and cable connector are connected, the orientation of the pin connector and/or cable connector is adjusted so that both front ends face each other. Here, the north and south poles of the magnets 871 in the pin connector face the south and north poles of the magnets 971 in the cable connector, and the connectors are connected by the magnetic force.

However, conventional connectors can only be used to connect a band-like cable 991 to a circuit board. They cannot be used to connect a band-like cable to another band-like cable. With the dramatic increase in the amount of information transmitted to electronic devices in recent years, many believe that waveguides, which are able to transmit electromagnetic waves in higher bandwidths, will replace conventional cables. However, conventional connecting devices cannot be used to connect waveguides to each other.

SUMMARY OF THE PRESENT DISCLOSURE

It is an object of the Present Disclosure to solve the aforementioned problems by providing a connecting device which is easy to manufacture, which has a simple, low-cost structure, which is easy to handle despite being small, and which is able to accurately position and connect waveguides to each other, thereby increasing overall reliability.

The Present Disclosure is a connecting device comprising a first connecting member having a first housing receiving a connected first waveguide, and a second connecting member having a second housing receiving a connected second waveguide. The first housing has a first mating surface and a first magnet, and the second housing has a second mating surface and a second magnet. The first connecting member and the second connecting member are displaced relative to each other in a mating direction orthogonal to the axial direction of the first waveguide and the second waveguide, and are positioned relative to each other by the magnetic force of the first magnet and the second magnet.

In another connecting device of the Present Disclosure, the first housing has a first guide portion formed on the first mating surface, and the second housing has a second guide portion formed on the second mating surface. The first mating surface is orthogonal to the axial direction of the first waveguide, the second mating surface is orthogonal to the axial direction of the second waveguide. The first connecting member and the second connecting member are displaced relative to each other in the mating direction while the first mating surface and the second mating surface are facing each other, and the first guide portion and the second guide portion are engaged.

In another connecting device of the Present Disclosure, the first guide portion and the second guide portion each have a reference surface. The first connecting member and the second connecting member are positioned relative to each other by the magnetic force of the first magnet and the second magnet, bringing the reference surface of the first guide portion into contact with the reference surface of the second guide portion.

In another connecting device of the Present Disclosure, the first connecting member and the second connecting member remain positioned relative to each other by the magnetic three of the first magnet. The second magnet presses the reference surface of the first guide portion and the reference surface of the second guide portion against each other.

In another connecting device of the Present Disclosure, the first magnet and the second magnet are attracted to each other when the first connecting member and the second connecting member have been positioned relative to each other and mated.

In another connecting device of the Present Disclosure, the leading end surface of the first waveguide and the leading end surface of the second waveguide face each other, and a gap is present between the leading end surface of the first waveguide and the leading end surface of the second waveguide when the first connecting member and the second connecting member are positioned relative to each other and mated.

In another connecting device of the Present Disclosure, the first mating surface and the second mating surface contact each other.

The Present Disclosure is thus able to provide a connecting device which is easy to manufacture, which has a simple, low-cost structure, which is easy to handle despite being small, and which is able to accurately position and connect waveguides to each other, thereby increasing overall reliability.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIGS. 2A and 2B are a pair of figures showing the first connecting member and the second component of FIG. 1 connected to each other in the embodiment of the Present Disclosure, in which FIG. 2A is a top view, and FIG. 2B is a cross-sectional view from A-A in FIG. 2A;

FIGS. 5A and 5B are a pair of figures used to explain the operations performed to attach the first waveguide in the first connecting member of FIG. 1, in which FIG. 5A shows the situation before the waveguide has been attached, and FIG. 5B shows the situation afterwards;

FIGS. 7A, 7B and 7C are a set of figures used to explain the operations performed to connect the first connecting member and the second connecting member of FIG. 1 to each other; and FIGS. 8A and 8B are a pair of perspective views of conventional connecting devices, in which FIG. 8A is a perspective view of the connecting device on the fixed side, and FIG. 8B is a perspective view of the connecting device on the cable side.

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
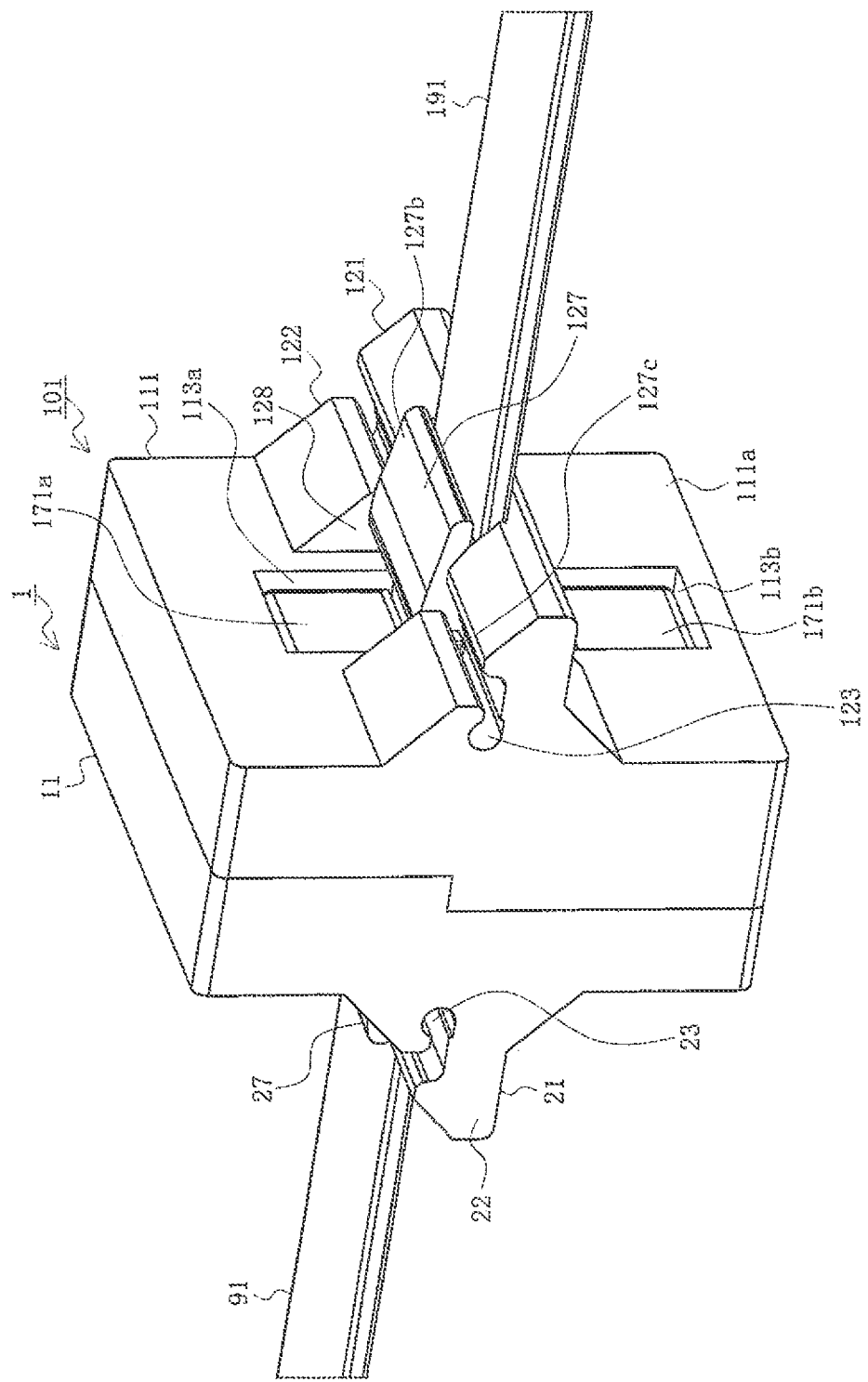
FIG. 1 is a perspective view showing a first connecting member and a second connecting member connected to each other, according to the Present Disclosure.

Referring to FIGS. 1-5B, 1 (FIGS. 1 and 2A) is the first connector in the embodiment of the Present Disclosure. This is sometimes referred to as the one connecting member or the first connecting member. The terminal end of a first waveguide 91 (FIGS. 1, 2A, 2B, 5A and 5B) is attached to this connecting member. In the embodiment, 101 (FIGS. 1 and 2A) is the second connector. This is sometimes referred to as the other connecting member or the second connecting member. The terminal end of a second waveguide 191 (FIGS. 1, 2A and 2B) is attached to this connecting member. The first connector 1 and the second connector 101 are mated with and connected to each other as shown in FIGS. 1, 2A and 2B.

The first waveguide 91 and the second waveguide 191 are waveguides having substantially identical configurations, and function as a transmission route for transmitting electromagnetic waves in the higher frequency bands such as microwaves and millimeter waves. The first waveguide 91 and the second waveguide 191 are usually long components. In the example shown in the figures, for the sake of convenience, the length has been shortened. The first waveguide 91 and the second waveguide 191 may be any type of waveguide and have any type of structure. However, here, the waveguides are composed of a rod or wire-shaped dielectric, and an outer conductor covering the outer peripheral surface of the dielectric. The dielectric may be made of a flexible dielectric material such as a synthetic resin. Examples include fluororesins such as polytetrafluoroethylene, cycloolefin polymer resins, cyclic olefin copolymer resins, polypropylene resins and polyethylene resins. The outer conductor may be made of a highly conductive material such as metal. Examples include copper, gold, silver, aluminum and alloys of these elements.

The first connector 1 is an integrated unit comprising a first housing 11 (FIGS. 1, 2A, 3, 4, 5A and 5B) having a substantially rectangular parallelepiped shape, a first actuator 27 (FIGS. 1, 2A, 4, 5A and 5B) or first holding member attached to the first housing 11 to hold in place the first waveguide 91 connected to the first housing 11, and a first upper magnet 71a (FIGS. 2B, 4, 5A and 5B) and a first lower magnet 71b (FIGS. 2B, 4, 5A and 5B) which are permanent magnets used to connect the first connector 1 and the second connector 101.

The second connector 101 is an integrated unit comprising a second housing 111 (FIGS. 1, 2A and 3) having a substantially rectangular parallelepiped shape, a second actuator 127 (FIGS. 1 and 2A) or second holding member attached to the second housing 111 to hold in place the second waveguide 191 connected to the second housing 111, and a second upper magnet 171a (FIGS. 1 and 2B) and a second lower magnet 171b (FIGS. 1 and 2B) which are permanent magnets used to connect the first connector 1 and the second connector 101.

In the present embodiment, the first actuator 27 and the second actuator 127 are substantially identical components and are referred to collectively in the explanation as actuators 27 and 127. The first upper magnet 71a, the first lower magnet 71b, the second upper magnet 171a, and the second lower magnet 171b are substantially identical components.

The first housing 11 and the second housing 111 may be made of a conductive material such as a synthetic resin. However, from the standpoint of preventing leakage of electromagnetic waves, a conductive metal is preferred. Examples include copper, gold, silver, aluminum and alloys of these metals. In the following explanation, the first housing 11 and the second housing 111 are components integrally formed from a copper alloy or aluminum alloy.

The first housing 11 has a substantially rectangular parallelepiped shape, but a waveguide connecting portion 21 (FIGS. 1, 2A, 3, 4, 5A and 5B) is integrally formed in a front surface 11a (FIGS. 2B, 4, 5A and 5B) which protrudes forward, and a guiding recessed portion 12 (FIG. 3) is formed as a first guiding portion in a rear surface 11b (FIGS. 2B and 3) serving as the first mating surface. The first housing 11 includes a waveguide insertion hole 18 (FIGS. 2B and 3) which passes through the first housing 11 in the thickness direction, opens into the front surface 11a and the rear surface 11b, and has a narrow slit-like cross-sectional profile similar to that of the first waveguide 91 extending in the transverse direction of the first housing 11. An upper magnet accommodating recessed portion 13a (FIGS. 4, 5A and 5B) and a lower magnet accommodating recessed portion 13b (FIGS. 4, 5A and 5B) are formed as recessed portions in the front surface 11a of the first housing 11.

The waveguide insertion hole 18 receives the terminal end or leading end of the first waveguide 91, and is formed orthogonal to the flat rear surface 11b. It preferably opens into the rear surface 11b along the center line of the first housing 11 in the transverse direction, and opens into the rear surface 11b along the centerline of the first housing 11 in the vertical direction as well. The upper magnet accommodating recessed portion 13a and the lower magnet accommodating recessed portion 13b are formed, respectively, above and below the waveguide insertion hole 18. As a result, the first upper magnet 71a and the first lower magnet 71b accommodated inside the upper magnet accommodating recessed portion 13a and the lower magnet accommodating recessed portion 13b are also positioned above and below the waveguide insertion hole 18.

The guiding recessed portions 12 have a substantially rectangular parallelepiped shaped and are formed on both the left and the right sides of the rear surface 11b and extend in the vertical direction. The bottom end of each opens into the lower surface of the first housing 11, and the side ends on the outside in the transverse direction of the first housing 11 open into the side surfaces of the first housing 11. A bottom surface 12c (FIG. 3) of each guiding recessed portion 12 has a flat, rectangular profile extending in the vertical direction; an upper end wall 12a (FIGS. 3, 4 and 5A) of each guiding recessed portion 12 extends in the transverse direction, and has a flat surface substantially orthogonal to the rear surface 11b, and a side end wall 12b (FIG. 3) of each guiding recessed portion 12 on the inside in the transverse direction of the first housing 11 extends in the vertical direction, and has a flat surface substantially orthogonal to the rear surface 11b.

Each upper end wall 12a functions as a reference surface for positioning the first housing 11 and the second housing 111 relative to each other in the vertical direction. Each side end wall 12b functions as a reference surface for positioning the first housing 11 and the second housing 111 relative to each other in the transverse direction.

The waveguide connecting portion 21 includes a band-like waveguide passage recessed portion 28 communicating with the waveguide insertion hole 18, and an actuator mounting portion 22 formed on both the left and the right side of the waveguide passage recessed portion 28. The waveguide passage recessed portion 28 is a groove-shaped portion formed in the central portion of the waveguide connecting portion 21 in the transverse direction, and has an upper surface formed so as to extend in the thickness direction of the first housing 11, and a bottom surface flush with the lower surface of the waveguide insertion hole 18. An arm accommodating opening 23 is formed in the actuator mounting portion 22 so as to rotatably accommodate the arm portion 27c of the first actuator 27.

The waveguide connecting portion 21 includes a band-like waveguide passage recessed portion 28 (FIGS. 2B, 4 and 5A) communicating with the waveguide insertion hole 18, and an actuator mounting portion 22 (FIGS. 1, 3, 4 and 5A) formed on both the left and the right side of the waveguide passage recessed portion 28. The waveguide passage recessed portion 28 is a groove-shaped portion formed in the central portion of the waveguide connecting portion 21 in the transverse direction, and has an upper surface formed so as to extend in the thickness direction of the first housing 11, and a bottom surface flush with the lower surface of the waveguide insertion hole 18. An arm accommodating opening 23 (FIGS. 1, 3, 4, 5A and 5B) is formed in the actuator mounting portion 22 so as to rotatably accommodate an arm portion 27c (FIG. 4) of the first actuator 27.

Figures 2A, 2B:
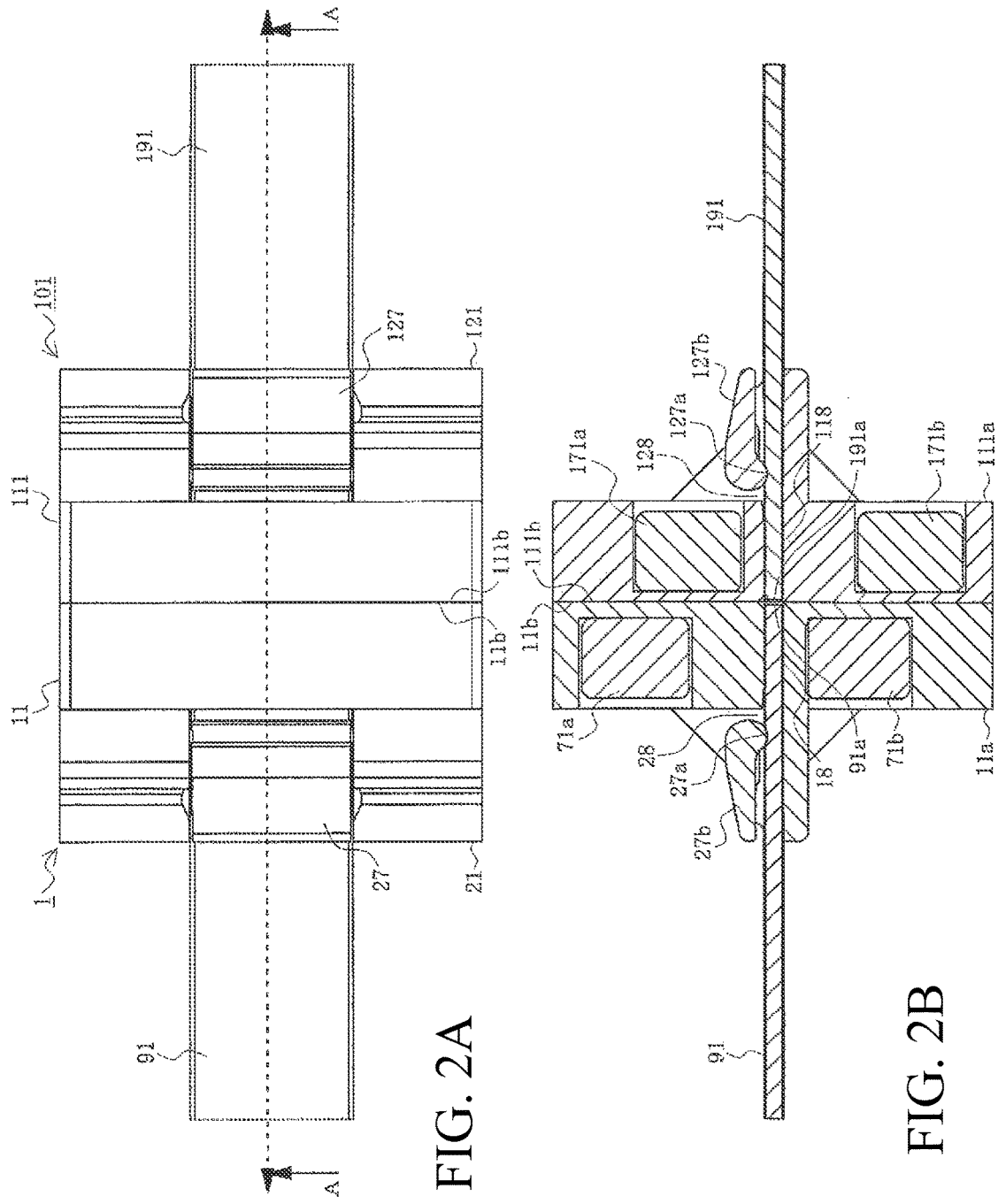
Figure 3:
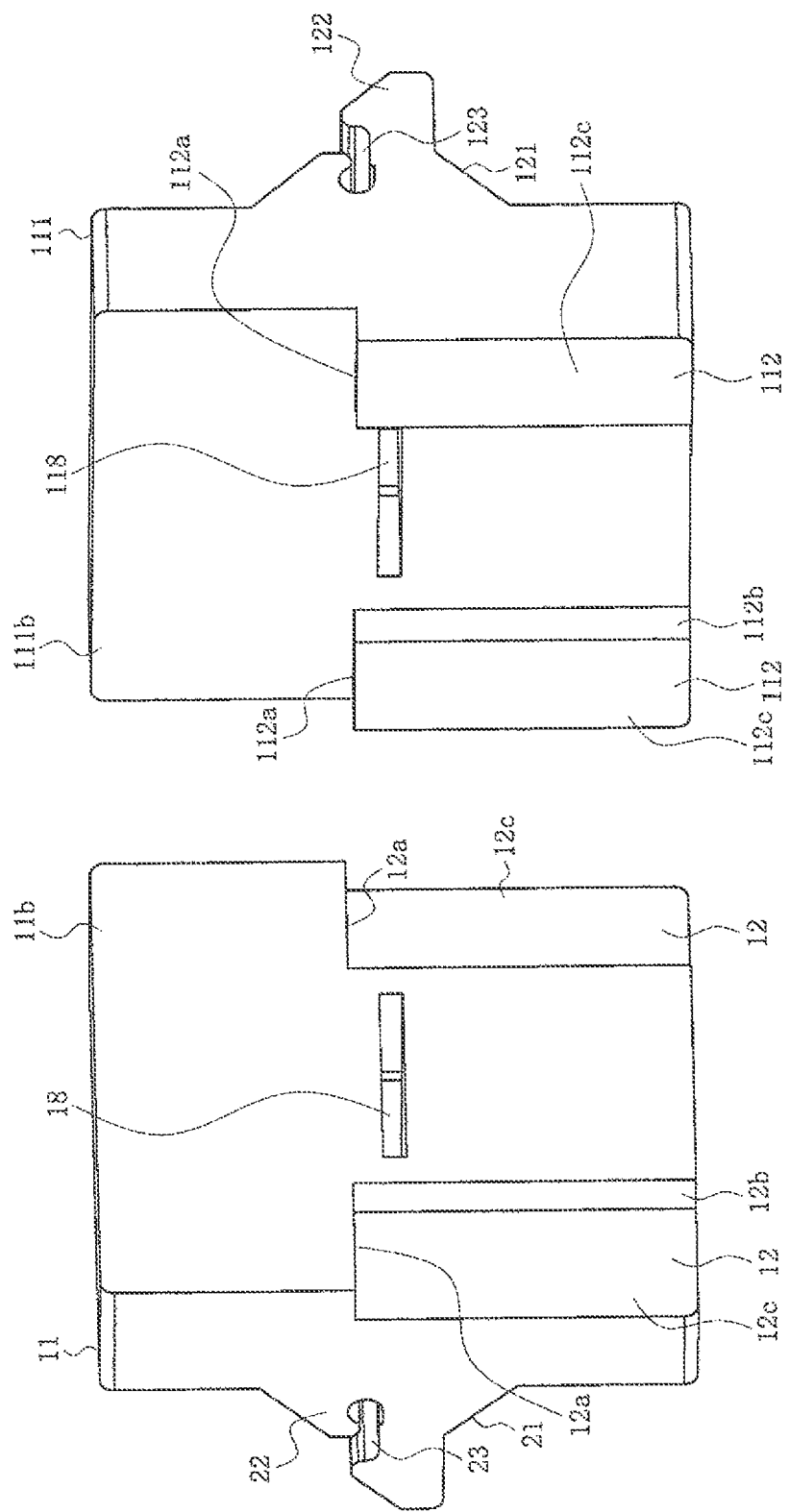
FIG. 3 is a perspective view showing the back surface of the first connecting member and the back side of the second connecting member of FIG. 1.
Figure 4:
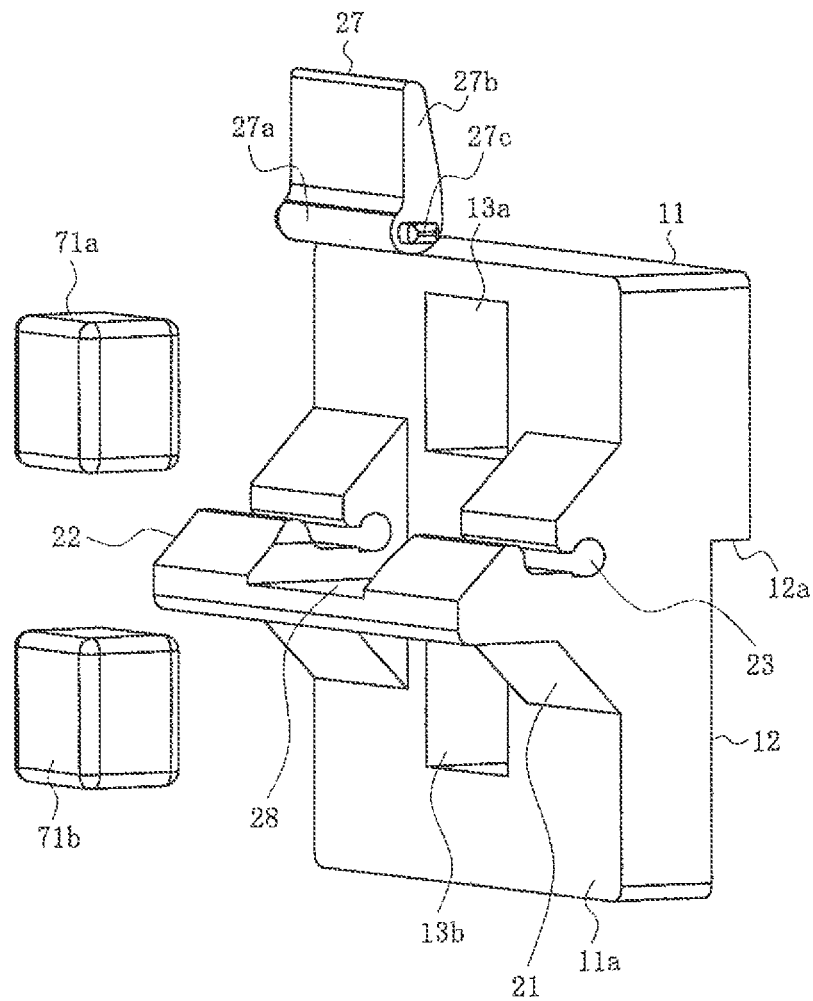
FIG. 4 is an exploded view of the first connecting member of FIG. 1.
Figure 5B:
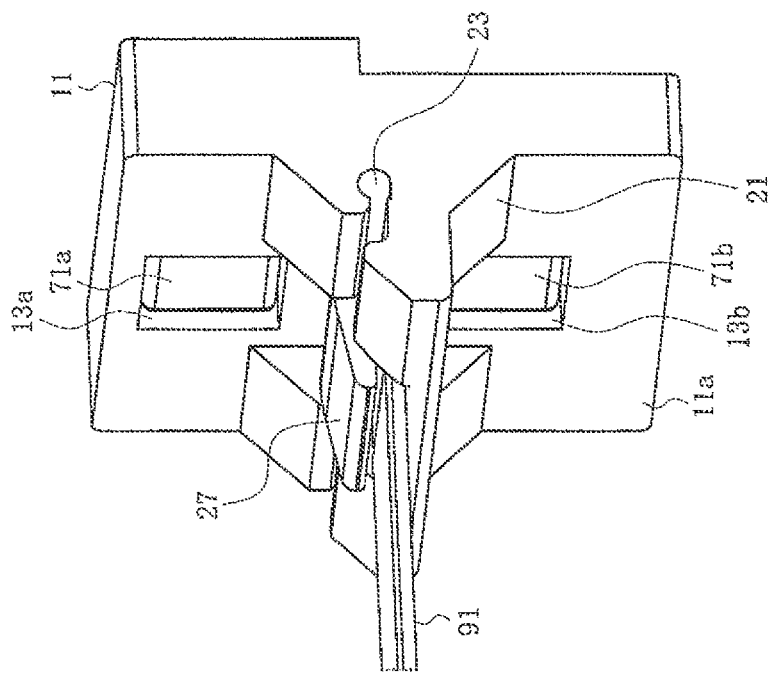
Figure 5A:
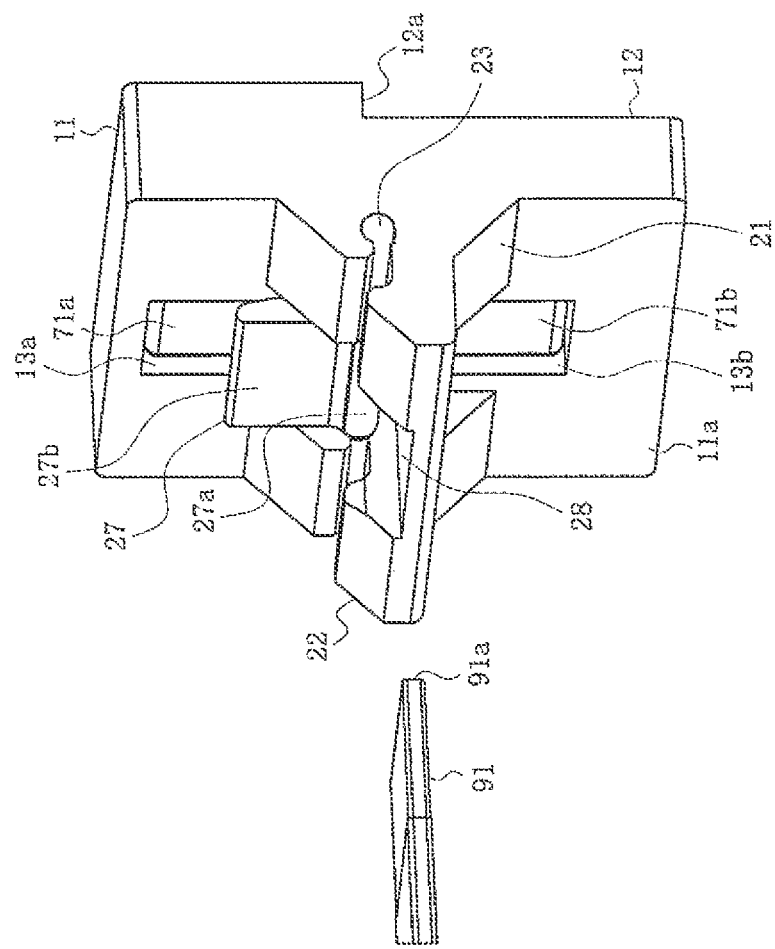

The first actuator 27 includes a pressure-applying portion 27a (FIGS. 2B, 4 and 5A) able to apply pressure to the upper surface of the first waveguide 91, a flat, strip-like operating portion 27b (FIGS. 2B, 4 and 5A) extending in the direction orthogonal to the axial direction from the pressure-applying portion 27a, and the arm portion 27c extending in the axial direction from both the left and the right sides of the pressure-applying portion 27a. When the arm portion 27c is rotatably accommodated inside arm accommodating opening 23, the first actuator 27 can be switched from the first posture or open posture shown in FIG. 5A to the second posture or closed posture shown in FIG. 5B, and vice versa. Because the pressure-applying portion 27a is positioned upward when the first actuator 27 is in the first posture, the leading end of the first waveguide 91 can be inserted into the waveguide insertion hole 18 via the waveguide passage recessed portion 28. When the insertion of the waveguide into the waveguide insertion hole 18 has been completed, the operator operates the operating portion 27b using a finger to change the posture of the first actuator 27 from the first posture to the second posture. As a result, the pressure-applying portion 27a applies downward pressure on the upper surface of the first waveguide 91, as shown in FIG. 2B, and the first connector 1 is connected to the first waveguide 91 in a manner that prevents displacement.

As in the case of the first housing 11, the second housing 111 has a substantially rectangular parallelepiped shape, but a waveguide connecting portion 121 (FIGS. 1, 2A and 3) is integrally formed in a front surface 111a (FIGS. 1 and 2B) which protrudes forward. The second housing 111 includes a waveguide insertion hole 118 (FIGS. 2B and 3) which passes through the second housing 111 in the thickness direction, opens into the front surface 111a and a rear surface 111b (FIGS. 2B and 3) or second mating surface, and has a narrow slit-like cross-sectional profile similar to that of the second waveguide 191 extending in the transverse direction of the second housing 111. An upper magnet accommodating recessed portion 113a (FIG. 1) and a lower magnet accommodating recessed portion 113b (FIG. 1) are formed as recessed portions in the front surface 111a of the second housing 111.

As in the case of the first housing 11, the waveguide insertion hole 118 receives the terminal end or leading end of the second waveguide 191, and is formed orthogonal to the flat rear surface 111b. It preferably opens into the rear surface 111b along the center line of the second housing 111 in the transverse direction, and opens into the rear surface 111b along the centerline of the second housing 111 in the vertical direction as well. The upper magnet accommodating recessed portion 113a and the lower magnet accommodating recessed portion 113b are formed, respectively, above and below the waveguide insertion hole 118. As a result, the second upper magnet 171a and the second lower magnet 171b accommodated inside the upper magnet accommodating recessed portion 113a and the lower magnet accommodating recessed portion 113b are also positioned above and below the waveguide insertion hole 118.

However, this differs from the first housing 11 in that guiding protrusion portions 112 (FIG. 3) are formed in the rear surface 111b of the second housing 111. The guiding protrusion portions 112 have a complementary relationship to the guiding recessed portions 12 in the first housing 11, and engage the guiding recessed portions 12. The guiding protrusion portions 112 function as second guiding portions by engaging the guiding recessed portions 12, and sliding the second housing 111 vertically with respect to the first housing 11. When the guiding recessed portions 12 and the guiding protrusion portions 112 slide the second housing 111 vertically with respect to the first housing portion 11, the second housing 111 is positioned in the transverse direction with respect to the first housing 11. When the sliding stops, the second housing 111 is positioned vertically with respect to the first housing 11 as well.

More specifically, the guiding protrusion portions 112 have a substantially rectangular parallelepiped shape and are formed on both the left and the right sides of the rear surface 111b and extend in the vertical direction. The bottom end wall of each is flush with the lower surface of the second housing 111, and the side end walls to the outside in the transverse direction of the second housing 111 are flush with the side surfaces of the second housing 111. A ceiling surface 112c (FIG. 3) of each guiding protrusion portion 112 is a flat, rectangular surface extending vertically, and an upper end wall 112a (FIG. 3) of each guiding protrusion portion 112 is a flat surface extending in the transverse direction and is substantially orthogonal to the rear surface 111b. The inner end wall 112b (FIG. 3) to the inside in the transverse direction of the guiding protrusion portion 112 is a flat surface extending in the vertical direction and is substantially orthogonal to the rear surface 111b.

Each upper end wall 112a functions as a reference surface for positioning the first housing 11 and the second housing 111 relative to each other in the vertical direction. Each side end wall 112b functions as a reference surface for positioning the first housing 11 and the second housing 111 relative to each other in the transverse direction.

As in the case of the first housing 11, the waveguide connecting portion 121 includes a band-like waveguide passage recessed portion 128 (FIGS. 1 and 2B) communicating with the waveguide insertion hole 118, and an actuator mounting portion 122 (FIGS. 1 and 3) formed on both the left and the right side of the waveguide passage recessed portion 128. The waveguide passage recessed portion 128 is a groove-shaped portion formed in the central portion of the waveguide connecting portion 121 in the transverse direction, and has an upper surface formed so as to extend in the thickness direction of the second housing 111, and a bottom surface flush with the lower surface of the waveguide insertion hole 118. An arm accommodating opening 123 (FIGS. 1 and 3) is formed in the actuator mounting portion 122 so as to rotatably accommodate an arm portion 127c of the second actuator 127.

As in the case of the first actuator 27, the second actuator 127 includes a pressure-applying portion 127a (FIG. 2B) able to apply pressure to the upper surface of the second waveguide 191, a flat, strip-like operating portion 127b (FIGS. 1 and 2B) extending in the direction orthogonal to the axial direction from the pressure-applying portion 127a, and the arm portion 127c (FIG. 1) extending in the axial direction from both the left and the right sides of the pressure-applying portion 127a. When the arm portion 127c is rotatably accommodated inside arm accommodating opening 123, the second actuator 127 can be switched from a first posture or open posture to a second posture or closed posture, and vice versa. Because the pressure-applying portion 127a is positioned upward when the second actuator 127 is in the first posture, the leading end of the second waveguide 191 can be inserted into the waveguide insertion hole 118 via the waveguide passage recessed portion 128. When the insertion of the waveguide into the waveguide insertion hole 118 has been completed, the operator operates the operating portion 127b using a finger to change the posture of the second actuator 127 from the first posture to the second posture. As a result, the pressure-applying portion 127a applies downward pressure on the upper surface of the second waveguide 191, as shown in FIG. 2B, and the second connector 101 is connected to the second waveguide 191 in a manner that prevents displacement.

The first magnets 71a, 71b and the second magnets 171a, 171b are arranged so that the magnetic poles facing each other are different. In other words, when the first connector 1 and the second connector 101 have been connected to each other, as shown in FIG. 2B, the first magnets 71a, 71b and the second magnets 171a, 171b are arranged so that the magnetic poles facing each other are different. For example, when the magnetic pole of the first upper magnet 71a on the second connector 101 (the right side in FIG. 2B) is a south pole, the magnetic pole of the second upper magnet 171a on the first connector 1 (the left side in FIG. 2B) is a north pole. Similarly, when the magnetic pole of the first lower magnet 71b on the second connector 101 is a north pole, the magnetic pole of the second lower magnet 171b on the first connector 1 is a south pole. Because the opposing first magnets 71a, 71b and second magnets 171a, 171b are attracted to each other, the first housing 11 and the second housing 111 are brought together, and the rear surfaces 11b and 111b come into close contact.

The positions of the opposing first magnets 71a, 71b and second magnets 171a, 171b are staggered in the vertical direction. In other words, as shown in FIG. 2B, the first upper magnet 71a and the first lower magnet 71b arranged in the first housing 11, which has an upper end wall 12a with a downward facing reference surface for positioning the first housing 11 and the second housing 111 relative to each other in the vertical direction, are positioned above the second upper magnet 171a and second lower magnet 171b arranged in the second housing 111, which has an upper end wall 112a with an upward facing reference surface. When the opposing magnets 71a, 71b and 171a, 171b are attracted to each other, the second housing 111 is pulled upward relative to the first housing 11, the upper end walls 112a of the guiding protrusion portions 112 come into contact with the upper end walls 12a of the guiding recessed portions 12, and the first housing 11 and the second housing 111 are positioned with respect to the vertical direction. The side end walls 112b of the guiding protrusion portions 112 come into contact with the side end walls 12b of the guiding recessed portions 12 to position the first housing 11 and the second housing 111 with respect to the transverse direction.

When the first connector 1 and the second connector 101 have been connected to each other, the first housing 11 and the second housing 111 are positioned correctly, a leading end surface 91a (FIGS. 2B and 5A) of the first waveguide 91 connected to the first connector 1 is properly oriented relative to a leading end surface 191a (FIG. 2B) of the second waveguide 191 connected to the second connector 101, and electromagnetic waves can be transmitted between the first waveguide 91 and the second waveguide 191. The first waveguide 91 and the second waveguide 191 are flexible, bendable components but, at the very least, the portions inserted into the waveguide insertion hole 18 of the first housing 11 and into the waveguide insertion hole 118 of the second housing 111 are straight. As shown in FIG. 2B, when the leading end surface 91a of the first waveguide 91 and the leading end surface 191a of the second waveguide 191 are properly positioned with respect to each other, the central axis of the portion of the first waveguide 91 inserted into the waveguide insertion hole 18 of the first housing 11 is, at the very least, coaxial with the central axis of the portion of the second waveguide 191 inserted into the waveguide insertion hole 118 of the second housing 111.

With the first waveguide 91 connected to the first connector 1, the leading end surface 91a is either flush with the rear surface 11b of the first housing 11, or is slightly lower (recessed) in the direction of the front surface 11a from the rear surface 11b. Similarly, with the second waveguide 191 connected to the second connector 101, the leading end surface 191a is either flush with the rear surface 111b of the second housing 111, or is slightly lower (recessed) in the direction of the front surface 111a from the rear surface 111b. Even though there is a gap (for example, 0.05 mm or less) between the leading end surface 91a of the first waveguide 91 and the leading end surface 191a of the second waveguide 191, electromagnetic waves can be transmitted between the first waveguide 91 and the second waveguide 191. Because the rear surface 11b of the first housing 11 is in close contact with the rear surface 111b of the second housing 111, there is no gap around the leading end surface 91a of the first waveguide 91 and the leading end surface 191a of the second waveguide 191, and so there is no leakage of electromagnetic waves on the periphery.

Figure 6:
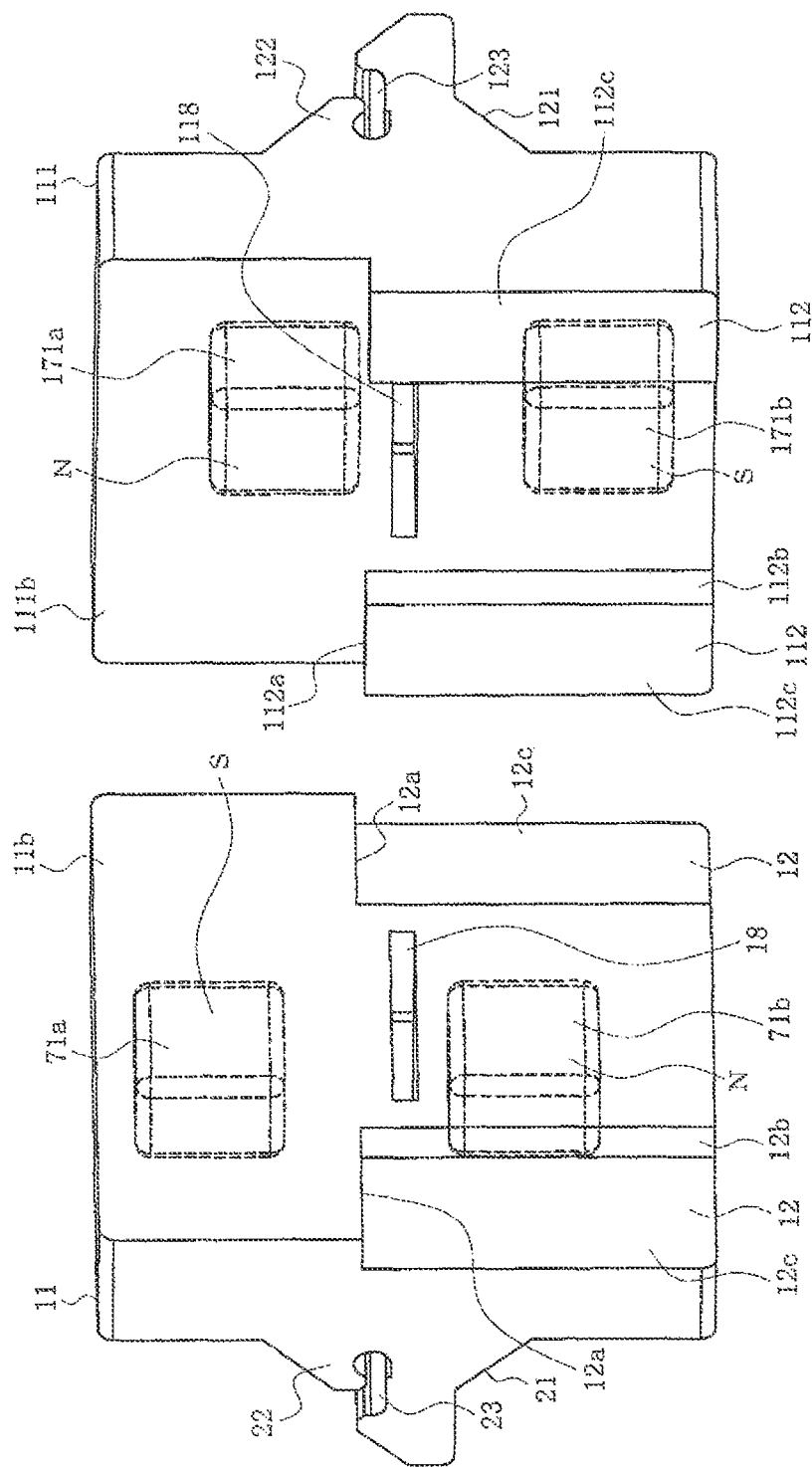
FIG. 6 is another perspective view showing the back surface of the first connecting member and the back side of the second connecting member of FIG. 1.
Figure 8A:
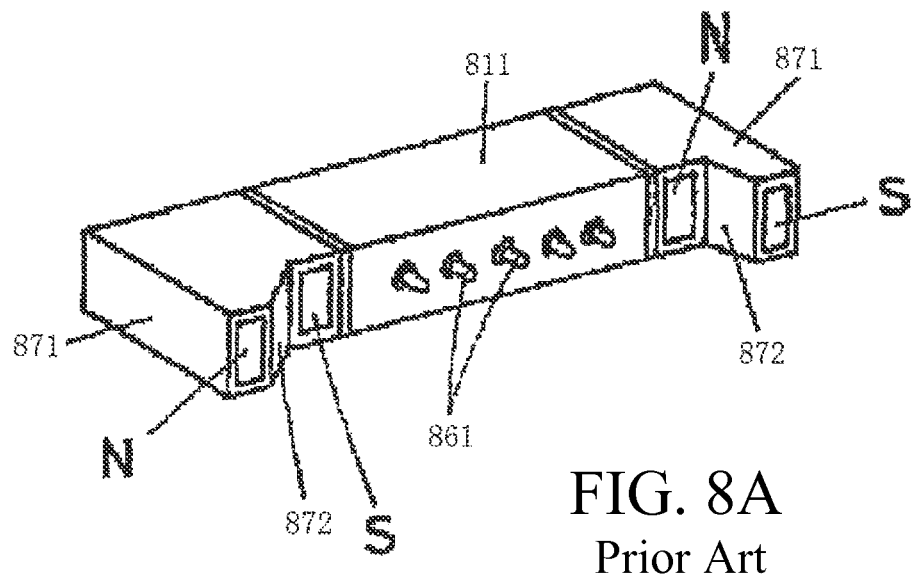
Figure 8B:
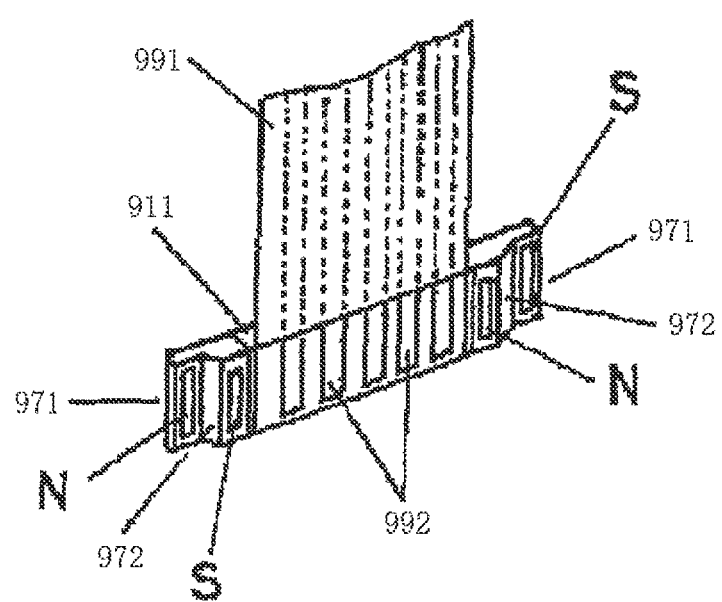

FIGS. 6-7C illustrate the operations performed to mate and connect a first connector 1 and a second connector 101 having the configurations described above. Before the first connector 1 and the second connector 101 are mated with each other and connected, the operator connects the first waveguide 91 and the second waveguide 191 to the first connector 1 and the second connector 101. More specifically, as described above, when the first actuator 27 and the second actuator 127 are both in the first posture, the leading ends of the first waveguide 91 and the second waveguide 191 are inserted, respectively, into the waveguide insertion hole 18 via the waveguide passage recessed portion 28 of the first housing 11, and into the waveguide insertion hole 118 via the waveguide passage recessed portion 128 of the second housing 111. Both the first actuator 27 and the second actuator 127 are then changed to the second posture to connect the first waveguide 91 and the second waveguide 191 to the first connector 1 and the second connector 101, respectively, in a manner that prevents displacement. To simplify the following explanation the first waveguide 91 and the second waveguide 191 are not depicted in FIGS. 6-7C.

Here, the first magnets 71 and the second magnets 171 are arranged as shown in FIG. 6 so that the opposing magnetic poles are different. In other words, the magnetic poles on the second connector 101 side of the first upper magnet 71a and first lower magnet 71b of the first connector 1 are a south pole and a north pole, respectively, and the magnetic poles on the first connector 1 side of the second upper magnet 171a and second lower magnet 171b of the second connector 101 are a north pole and a south pole, respectively.

First, as shown in FIG. 7A, the operator orients the rear surface 11b or mating surface of the first housing 11 of the first connector 1 so that it faces the rear surface 111b or mating surface of the second housing 111 of the second connector 101. Next, the operator, as shown in FIG. 7B, positions the second housing 111 below the first housing 11, and brings the rear surface 11b of the first housing 11 into contact with the rear surface 111b of the second housing 111. Here, the operator engages the guiding recessed portions 12 of the first housing 11 with the corresponding guiding protrusion portions 112 of the second housing 111. This positions the first housing 11 and the second housing 111 with respect to each other in the transverse direction.

Next, while keeping the rear surface 11b of the first housing 11 facing the rear surface 111b of the second housing 111, and the guiding recessed portions 12 of the first housing 11 engaged with the guiding protrusion portions 112 of the second housing 111, the operator moves the first connector 1 and the second connector 101 relative to each other in the mating direction, that is, in the vertical direction orthogonal to the axial direction of the first waveguide 91 and the second waveguide 191. More specifically, the second housing 111 is slid upward relative to the first housing 11. Here, the first lower magnet 71b and second upper magnet 171a repulse each other, but the force applied by the user's fingers is greater than the repulsive force of the first lower magnet 71b and the second upper magnet 171a. As a result, the second housing 111 can be slid upward relative to the first housing 11, while keeping the rear surface 11b of the first housing 11 facing the rear surface 111b of the second housing 111, and the guiding recessed portions 12 of the first housing 11 engaged with the guiding protrusion portions 112 of the second housing 111.

While sliding in this manner, the first lower magnet 71b of the first connector 1 moves lower than the second upper magnet 171a of the second connector 101, the first upper magnet 71a of the first connector 1 and the second upper magnet 171a of the second connector 101 are attracted to each other, and the first lower magnet 71b of the first connector 1 and the second lower magnet 171b of the second connector 101 are attracted to each other. As a result, even when the force applied by the operator's fingers is released, the second housing 111 slides above the first housing 11 while the rear surface 11b of the first housing 11 remains facing the rear surface 111b of the second housing 111, and the guiding recessed portions 12 of the first housing 11 remain engaged with the guiding protrusion portions 112 of the second housing 111.

Then, when the upper end walls 112a of the guiding protrusion portions 112 of the second housing 111 come into contact with the upper end walls 12a of the guiding recessed portions 12 of the first housing 11 as shown in FIG. 7C, the second housing 111 stops sliding upward relative to the first housing 11, and the first connector 1 and the second connector 101 are positioned relative to each other in the vertical direction, which is the mating direction. In this way, the first connector 1 and the second connector 101 are mated with each other and connected as shown in FIGS. 1, 2A and 2B, the leading end surface 91a of the first waveguide 91 and the leading end surface 191a of the second waveguide 191 are positioned properly so that the central axis of the first waveguide 91 is coaxial with the central axis of the second waveguide 191, and electromagnetic waves can be transmitted between the first waveguide 91 and the second waveguide 191.

In this state, as shown in FIGS. 2B and 7C, the first upper magnet 71a and the first lower magnet 71b arranged in the first housing 11 are positioned above the second upper magnet 71a and the second lower magnet 171b arranged in the second housing 111. As a result, the attractive force of the first magnets 71a, 71b and the second magnets 171a, 171b for each other acts as a force that lifts the second housing 111 relative to the first housing 11, and this reliably keeps the upper end wall 112a of the guiding protrusion portions 112 of the second housing 111 pressed against the upper end wall 12a of the guiding recessed portions 12 of the first housing 11. Similarly, the attractive force of the first magnets 71a, 71b and the second magnets 171a, 171b for each other reliably keeps the rear surface 111b of the second housing 111 pressed against the rear surface 11b of the first housing 11. The positional relationship of the first housing 11 and the second housing 111 relative to the transverse direction is maintained by the guiding recessed portions 12 of the first housing 11 engaged with the guiding protrusion portions 112 of the second housing 111. As a result, the leading end surface 91a of the first waveguide 91 and the leading end portion 191a of the second waveguide 191 are properly positioned and aligned, and the ability to transmit electromagnetic waves between the first waveguide 91 and the second waveguide 191 is reliably maintained.

In the explanation of the present embodiment, the means used to connect the first waveguide 91 and the second waveguide 191 to the first housing 11 and the second housing 111, respectively, were a first actuator 27 and a second actuator 127. However, the means used to connect the first waveguide 91 and the second waveguide 191 to the first housing 11 and the second housing 111, respectively, do not have to be a first actuator 27 and a second actuator 127. Other means can be used. For example, the leading ends of the first waveguide 91 and the second waveguide 191 may be inserted, respectively, into the waveguide insertion hole 18 of the first housing 11 and the waveguide insertion hole 118 of the second housing 111, and an adhesive may be applied to bond the first waveguide 91 and the second waveguide 191 to the first housing 11 and the second housing 111, respectively. Here, the waveguide connecting portions 21 and 121 protruding forward from the first housing 11 and the second housing 111 can be omitted in addition to the first actuator 27 and the second actuator 127.

In the explanation of the present embodiment, substantially rectangular parallelepiped guiding recessed portions 12 and guiding protrusion portions 112 were used as the first guide portion and second guide portion when the second housing 111 was slid vertically relative to the first housing 11. However, the guiding recessed portions 12 and guiding protrusion portions 112 do not have to have a substantially rectangular parallelepiped shape. They can assume any shape. For example, the guiding recessed portions 12 may be slit-shaped grooves, and the guiding protruding portions 112 may be slender column-shaped protrusions that can be inserted into the grooves. In other words, members of any shape can be used as long as the second housing 111 can be positioned relative to the first housing 11 in the transverse direction, and as long as the second housing 111 is positioned vertically with respect to the first housing 11 when the sliding has stopped.

In the explanation of the present embodiment, there were two first magnets 71a, 71b arranged in the first housing 11 and two second magnets 71a, 171b arranged in the second housing 111. However, the number of first magnets 71a, 71b and second magnets 171a, 171b is not restricted to two. There may be one, or three or more. The positions at which the first magnets 71a, 71b are arranged in the first housing 11 and the positions at which the second magnets 171a, 171b are arranged in the second housing 111 are not restricted to the positions shown in the drawings. They may be placed in any position.

In the embodiment described above, the connecting device included a first connector 1 having a first housing 11 receiving a connected first waveguide 91, and a second connector 101 having a second housing 111 receiving a connected second waveguide 191. The first housing 11 has a rear surface 11b and first magnets 71a, 71b, and the second housing 111 has a rear surface 111b and second magnets 171a, 171b. The first connector 1 and the second connector 101 are movable relative to each other in a mating direction orthogonal to the axial direction of the first waveguide 91 and the second waveguide 191, and are positioned relative to each other by the magnetic force of the first magnets 71a, 71b and the second magnets 171a 171b.

As a result, the first connector 1 and the second connector 101 are easy to handle during the mating operation, and can be connected so that the first waveguide 91 and the second waveguide 191 are property aligned. Because the first connector 1 and the second connector 101 are small and have a simple configuration, costs can be reduced and manufacturing simplified.

Also, the first housing 11 has guiding recessed portions 12 formed in the rear surface 11b, the second housing 111 has guiding protrusion portions 112 formed in the rear surface 111b, rear surface 11b is orthogonal to the axial direction of the first waveguide 91, rear surface 111b is orthogonal to the axial direction of the second waveguide 191, and the first connector 1 and the second connector 101 are movable with respect to each other in the mating direction while rear surface 11b and rear surface 111b are facing each other and the guiding recessed portions 12 and guiding protrusion portions 112 are engaged. Because the first connector 1 and the second connector 101 can be moved relative to each other in the mating direction while the first housing 11 and the second housing 111 are positioned with respect to the transverse direction, the mating operation is easy to perform.

The guiding recessed portions 12 and the guiding protrusion portions 112 include upper end wall 12a and upper end wall 112a, respectively, and the first connector 1 and the second connector 101 are positioned relative to each other with the upper end wall 12a of the guiding recessed portions 12 in contact with the upper end wall 112a of the guiding protrusion portions 112 by the magnetic force of the first magnets 71a, 71b and the second magnets 171a, 171b. As a result, the first connector 1 and the second connector 101 can be easily and properly positioned in the mating direction.

The first connector 1 and the second connector 101 remain positioned relative to each other due to the magnetic force of first magnets 71a, 71b and the second magnets 171a, 171b pressing the upper end wall 12a of the guiding recessed portion 12 and the upper end wall 112a of the guiding protrusion portion 112 against each other. As a result, the first connector 1 and the second connector 101 can be reliably positioned in the mating direction using a simple configuration.

The first magnets 71a, 71b and the second magnets 171a, 171b are attracted to each other, respectively, when the first connector 1 and the second connector 101 have been positioned relative to each other and mated. As a result, the rear surfaces 11b and 111b reliably come into contact with each other and the first connector 1 and the second connector 101 can be reliably positioned in the mating direction using a simple configuration.

The leading end surface 91a of the first waveguide 91 and the leading end surface 191a of the second waveguide 191 are facing each other and a gap is present between the leading end surface 91a of the first waveguide 91 and the leading end surface 191a of the second waveguide 191 when the first connector 1 and the second connector 101 have been positioned relative to each other and mated. In this way, electromagnetic waves can be transmitted between the first waveguide 91 and the second waveguide 191.

Rear surface 11b comes into contact with rear surface 111b. Because no gap occurs on the periphery of the leading end surface 91a of the first waveguide 91 and the leading end surface 191a of the second waveguide, leakage of electromagnetic waves does not occur.

While a preferred embodiment of the Present Disclosure is shown and described, it is envisioned that those skilled in the art may devise various modifications without departing from the spirit and scope of the foregoing Description and the appended Claims.

What is claimed is:

1. A connecting device, the connecting device comprising:
a first connecting member, the first connecting member having a first housing, the first housing having a first mating surface and a first magnet and defining a first waveguide insertion hole, the first waveguide insertion hole extending in an axial direction, being open to the first mating surface and being configured to receive a first waveguide therein, the first magnet having a first polarity; and
a second connecting member, the second connecting member having a second housing, the second housing having a second mating surface and a second magnet and defining a second waveguide insertion hole, the second waveguide insertion hole extending in the axial direction, being open to the second mating surface and being configured to receive a second waveguide therein, the second magnet having a second polarity,
wherein the first connecting member and the second connecting member are movable relative to each other in a mating direction, wherein the mating direction is orthogonal to the axial direction,
wherein the first polarity of the first magnet is opposite the second polarity of the second magnet such that the first and second magnets are attracted to one another, wherein the attraction of the first and second magnets causes the first and second connecting members to be mated to one another such that the first mating surface faces the second mating surface, and such that the first and second waveguide insertion holes are in alignment with one another, and
wherein, when the first connecting member and the second connecting member are mated together, the first magnet and the second magnet are offset relative to one another in the mating direction.

2. The connecting device as defined in claim 1, wherein, the first waveguide is secured by the first connecting member and positioned within the first waveguide insertion hole, the second waveguide is secured by the second connecting member and positioned within the second waveguide insertion hole, wherein leading end surfaces of the first and second waveguides are positioned relative to each other to define a gap therebetween.

3. The connecting device as defined in claim 2, wherein the first connecting member has a first actuator, the first actuator being movable between first and second positions, wherein when the first actuator is in the first position, the first waveguide is capable of being moved in or out of the first waveguide insertion hole, wherein when the first actuator is in the second position, the first waveguide is capable of being secured in position within the first waveguide insertion hole.

4. The connecting device as defined in claim 2, wherein the second connecting member has a second actuator, the second actuator being movable between first and second positions, wherein when the second actuator is in the first position, the second waveguide is capable of being moved in or out of the second waveguide insertion hole, wherein when the second actuator is in the second position, the second waveguide is capable of being secured in position within the second waveguide insertion hole.

5. The connecting device as defined in claim 1, wherein, when the first connecting member and the second connecting member are mated together, the first mating surface and the second mating surface contact each other.

6. The connecting device as defined in claim 1, wherein the first connecting member has a first guide portion defining a first reference surface, and wherein the second connecting member has a second guide portion defining a second reference surface, wherein, when the first connecting member and the second connecting member are mated together, the first reference surface is pressed into contact with the second reference surface because of the attraction of the first and second magnets.

7. A connecting device, the connecting device comprising:
a first connecting member, the first connecting member having a first housing, the first housing having a first mating surface, the first housing having a first upper magnet and a first lower magnet, the first housing defining a first waveguide insertion hole, the first waveguide insertion hole extending in an axial direction, being open to the first mating surface and being configured to receive a first waveguide therein, the first upper magnet being positioned above the first waveguide insertion hole and having a first polarity, the first lower magnet being positioned below the first waveguide insertion hole and having a second polarity; and
a second connecting member, the second connecting member having a second housing, the second housing having a second mating surface, the second housing having a second upper magnet and a second lower magnet, the second housing defining a second waveguide insertion hole, the second waveguide insertion hole extending in the axial direction, being open to the second mating surface and being configured to receive a second waveguide therein, the second upper magnet being positioned above the second waveguide insertion hole and having a third polarity, the second lower magnet being positioned below the second waveguide insertion hole and having a fourth polarity, wherein the first connecting member and the second connecting member are movable relative to each other in a mating direction, wherein the mating direction is orthogonal to the axial direction, wherein the first polarity is opposite the third polarity such that the first upper magnet and the second upper magnet are attracted to one another, and wherein the second polarity is opposite the fourth polarity such that the first lower magnet and the second lower magnet are attracted to one another, wherein the attraction of the first upper and lower magnets and the second upper and lower magnets, respectively, causes the first and second connecting members to be mated to one another such that the first mating surface faces the second mating surface, and such that the first and second waveguide insertion holes are in alignment with one another, and wherein, when the first connecting member and the second connecting member are mated together, the first upper magnet and the second upper magnet are offset relative to one another in the mating direction, and the first lower magnet and the second lower magnet are offset relative to one another in the mating direction.

8. The connecting device as defined in claim 7, wherein the first and fourth polarities are the same, wherein the second and third polarities are the same, and wherein the first and fourth polarities are different from the second and third polarities.

9. The connecting device as defined in claim 7, wherein the first and second polarities are the same, wherein the third and fourth polarities are the same, and wherein the first and second polarities are different from the third and fourth polarities.

10. The connecting device as defined in claim 7, wherein, the first waveguide is secured by the first connecting member and positioned within the first waveguide insertion hole, the second waveguide is secured by the second connecting member and positioned within the second waveguide insertion hole, wherein leading end surfaces of the first and second waveguides are positioned relative to each other to define a gap therebetween.

11. The connecting device as defined in claim 10, wherein the first connecting member has a first actuator, the first actuator being movable between first and second positions, wherein when the first actuator is in the first position, the first waveguide is capable of being moved in or out of the first waveguide insertion hole, wherein when the first actuator is in the second position, the first waveguide is capable of being secured in position within the first waveguide insertion hole.

12. The connecting device as defined in claim 10, wherein the second connecting member has a second actuator, the second actuator being movable between first and second positions, wherein when the second actuator is in the first position, the second waveguide is capable of being moved in or out of the second waveguide insertion hole, wherein when the second actuator is in the second position, the second waveguide is capable of being secured in position within the second waveguide insertion hole.

13. The connecting device as defined in claim 7, wherein, when the first connecting member and the second connecting member are mated together, the first mating surface and the second mating surface contact each other.

14. The connecting device as defined in claim 7, wherein the first connecting member has a first guide portion defining a first reference surface, and wherein the second connecting member has a second guide portion defining a second reference surface, wherein, when the first connecting member and the second connecting member are mated together, the first reference surface is pressed into contact with the second reference surface because of the attraction of the first and second upper magnets and because of the attraction of the first and second lower magnets.

15. A method of connecting a first waveguide connector to a second waveguide connector, the method comprising the steps of:
a) providing first and second waveguide connectors, each waveguide connector having a mating face, a waveguide insertion hole which extends in an axial direction, an upper magnet positioned above the waveguide insertion hole, and a lower magnet positioned below the waveguide insertion hole, the upper magnets having opposite polarities such that they are attracted to one another, the lower magnets having opposite polarities such that they are attracted to one another;
b) positioning the first waveguide connector above the second waveguide connector;
c) orienting the first waveguide connector relative to the second waveguide connector such that the mating faces face each other; and
d) moving the first waveguide connector relative to the second waveguide connector in a mating direction, wherein the mating direction is orthogonal to the axial direction, until the waveguide insertion holes are in alignment with one another, wherein when the waveguide insertion holes are in alignment with one another, the upper magnets are offset from one another in the mating direction and the lower magnets are offset from one another in the mating direction.

* * * * *